(12) United States Patent
Tanielian et al.

(10) Patent No.: US 8,115,646 B2
(45) Date of Patent: Feb. 14, 2012

(54) ENVIRONMENTAL SENSOR SYSTEM (75) Inventors: Minas H Tanielian, Bellevue, WA (US);
Robert B. Greegor, Auburn, WA (US);
Stephen L. Fahley, Renton, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 12/474,010

(22) Filed: May 28, 2009

(65) Prior Publication Data
US 2010/0302065 A1 Dec. 2, 2010

(51) Int. Cl.
*G08B 17/10* (2006.01)
(52) U.S. Cl. ....................................... 340/632
(58) Field of Classification Search .......... 340/632, 340/962, 505, 506, 580, 602; 73/766, 802
See application file for complete search history.

(56) References Cited

U.S. PATENT DOCUMENTS

| | | | |
|---|---|---|---|
| 5,354,015 A * | 10/1994 | Meador | 244/134 F |
| 6,253,126 B1 * | 6/2001 | Palmer | 701/14 |
| 7,270,002 B2 | 9/2007 | Chen et al. | |
| 7,429,127 B2 * | 9/2008 | Walker et al. | 374/109 |
| 2004/0206854 A1 * | 10/2004 | Shah et al. | 244/144 |
| 2005/0105841 A1 | 5/2005 | Luo et al. | |
| 2005/0263646 A1 | 12/2005 | Nichols | |
| 2006/0050765 A1 | 3/2006 | Walker et al. | |
| 2007/0074580 A1 * | 4/2007 | Fallah-Rad et al. | 73/786 |
| 2008/0078233 A1 | 4/2008 | Larson et al. | |

* cited by examiner

*Primary Examiner* — Phung Nguyen
(74) *Attorney, Agent, or Firm* — Caven & Aghevli LLC (57) ABSTRACT

In one embodiment, a system to detect one or more environmental conditions in proximity to a surface comprises a first metamaterial environmental sensor module proximate the surface. The environmental sensor comprises a metamaterial-based electrically resonant structure having a resonance frequency which varies in response to changes in at least one of a humidity proximate the sensor module, a temperature proximate the sensor module, or the presence of a chemical or biological agent proximate the sensor module. The system further comprises a remote receiver to receive an electromagnetic signal comprising the signal generated by the electrically resonant structure and a signal analysis module to determine an environmental condition such as humidity, temperature, pre-ice conditions, ice, chemicals or biological species from the at least one environmental condition signal. Other embodiments may be described.

21 Claims, 6 Drawing Sheets

ENVIRONMENTAL SENSOR SYSTEM

FEDERALLY SPONSORED RESEARCH

This invention was made with Government support under contract number HR011-05-C-0068 awarded by the Defense Advanced Research Projects Agency. The government has certain rights in this invention.

BACKGROUND

During flight and while on the ground, aircraft may encounter atmospheric conditions that cause ice to form on critical flight surfaces, such as wings, stabilizers, rudders, and ailerons, propulsion system components, such as engine inlets, propellers, and engine rotors, in addition to the fuselage of the aircraft. Accumulating ice, if not removed, can add excessive weight to the aircraft and alter the aerodynamic and propulsive performance of the aircraft.

Some ice detection systems notify the flight crew of the formation of a threshold thickness of ice on a detection system sensor. Some such systems require the formation of ice on the sensor before a warning signal is generated. Such ice detection systems may have limited utility due to differences in ambient conditions near the critical flight surfaces and conditions on the sensor. Extensive and costly flight-testing may thus be required to validate sensor location on the airframe. Accordingly, improved systems and methods for monitoring environmental conditions may find utility.

SUMMARY

In various aspects, systems and methods to detect one or more environmental conditions in proximity to a surface are provided. By way of example, environmental conditions which may be detected may include humidity, temperature, or the presence of one or more chemical or biological materials proximate the surface. In some embodiments, systems may be mounted on a movable vehicle such as an aircraft, e.g., an airplane, helicopter, rocket, or the like.

Thus, in one aspect there is provided a method to detect one or more environmental conditions in proximity to a surface. In one embodiment the method comprises activating an environmental sensor module proximate the surface, wherein the environmental sensor comprises a metamaterial-based electrically resonant structure having a resonance frequency which varies in response to changes in at least one of a humidity proximate the sensor module, a temperature proximate the sensor module, or the presence of a chemical or biological agent proximate the sensor module. The method further comprises generating, in the environmental sensor module, an electromagnetic signal which comprises information about the resonance frequency, receiving, in a remote receiver, the electromagnetic signal comprising the signal generated by the environmental sensor module, and determining an environmental condition from the electromagnetic signal.

In another aspect there is provided a system to detect one or more environmental conditions in proximity to a surface. In one embodiment the system comprises an environmental sensor module proximate the surface, wherein the environmental sensor comprises a metamaterial-based electrically resonant structure having a resonance frequency which varies in response to changes in at least one of a humidity proximate the sensor module, a temperature proximate the sensor module, or the presence of a chemical or biological agent proximate the sensor module. The system further comprises a remote receiver to receive an electromagnetic signal comprising the signal generated by the electrically resonant structure, and a signal analysis module to determine an environmental condition from the at least one environmental condition signal.

In yet another aspect there is provided an aircraft comprising a fuselage and a system to detect one or more environmental conditions in proximity to a surface of the fuselage. In one embodiment, the system comprises an environmental sensor module proximate the surface, wherein the environmental sensor comprises a metamaterial-based electrically resonant structure having a resonance frequency which varies in response to changes in at least one of a humidity proximate the sensor module, a temperature proximate the sensor module, or the presence of a chemical or biological agent proximate the sensor module. The system further comprises a remote receiver to receive an electromagnetic signal comprising the signal generated by the electrically resonant structure, and a signal analysis module to determine an environmental condition from the at least one environmental condition signal.

BRIEF DESCRIPTION OF THE DRAWINGS

The detailed description is described with reference to the accompanying figures.

DETAILED DESCRIPTION

Described herein are exemplary systems and methods to implement an environmental sensor system. In some embodiments, an environmental sensor system may be installed on an airplane or other vehicle to detect one or more environmental conditions. For example, an environmental system may comprise one or more environmental sensors positioned in proximity to surfaces of an airplane to detect conditions conducive to the formation of ice on the surfaces of the airplane. In some embodiments, the one or more environmental sensors may communicate with a base station via a wireless communication link. The base station may comprise, or be coupled to, a processing device. The processing device may implement an analysis module to analyze signals received from the environmental sensors to determine environmental conditions in proximity to the sensors, and to generate and present a warning signal on a user interface in the event conditions in proximity to the sensor are conducive to the formation of ice.

Alternatively, the system can be used to monitor conditions on a roadway, bridge, aircraft runway, building, space structure, marine or other vehicles, and the like. Further, the system can be used to monitor for conditions conducive to buildup of other types of debris including dirt or dust, water, chemical materials, biological materials, and other materials.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
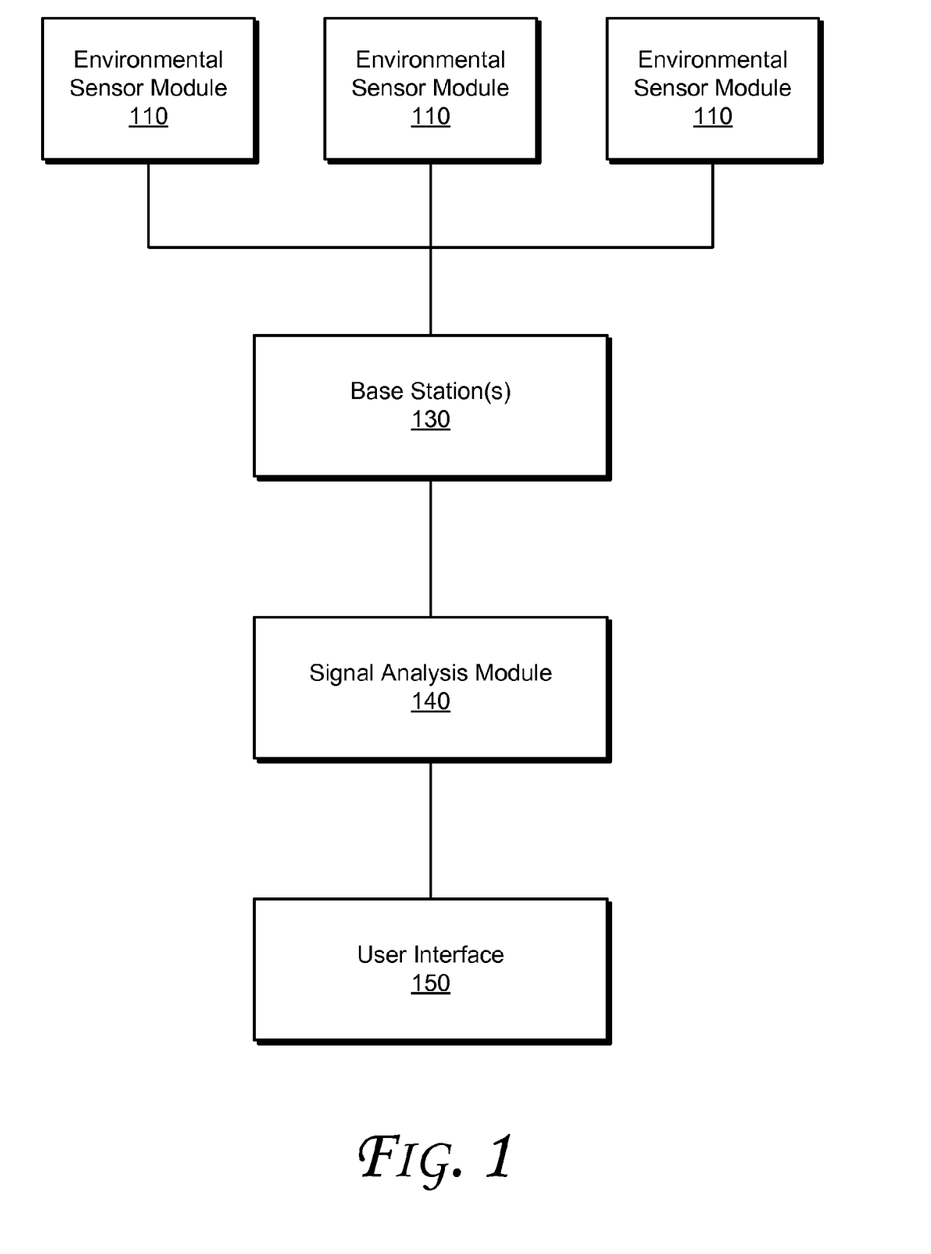
FIG. 1 is a schematic illustration of an environmental sensor system in accordance with some embodiments.

FIG. 1 is a schematic illustration of an environmental sensor system in accordance with some embodiments. Referring to FIG. 1, in one embodiment an environmental sensor system comprises one or more environmental sensor modules 110 communicatively coupled to one or more base station(s) 130. The particular form of the communication link between the environmental sensor module(s) 110 and the base station is not critical. In some embodiments, the environmental sensor module(s) 110 may be communicatively coupled to the base station(s) 130 by a communication bus, a fiber optical cable, or by a wireless communication link.

Base station(s) 130 comprise, or may be communicatively coupled to, a signal analysis module 140. In some embodiments, signal analysis module 140 may be implemented by logic instructions stored in a computer readable medium which may be executed on a general purpose processing device, e.g., a microprocessor or the like. In alternate embodiments the signal analysis module may be implemented by logic instructions stored in a configurable processing device, e.g., a field programmable gate array (FPGA) or the like. In alternate embodiments, signal analysis module 140 may be reduced to hardwire logic circuitry, e.g., an application specific integrated circuit or the like.

Signal analysis module 140 comprises, or may be communicatively coupled to, a user interface(s) 150. In some embodiments, user interface 150 may comprise a mechanism to present a visual display of a warning signal. For example, a warning light may be illuminated. Alternatively, a visual warning alert may be presented on a visual display such as a liquid crystal display (LCD) or a cathode ray tube (CRT) display. Alternatively, or in addition, an audible warning may be presented. Various aspects of the system and its operation are described with reference to FIGS. 2-7.

Figure 2:
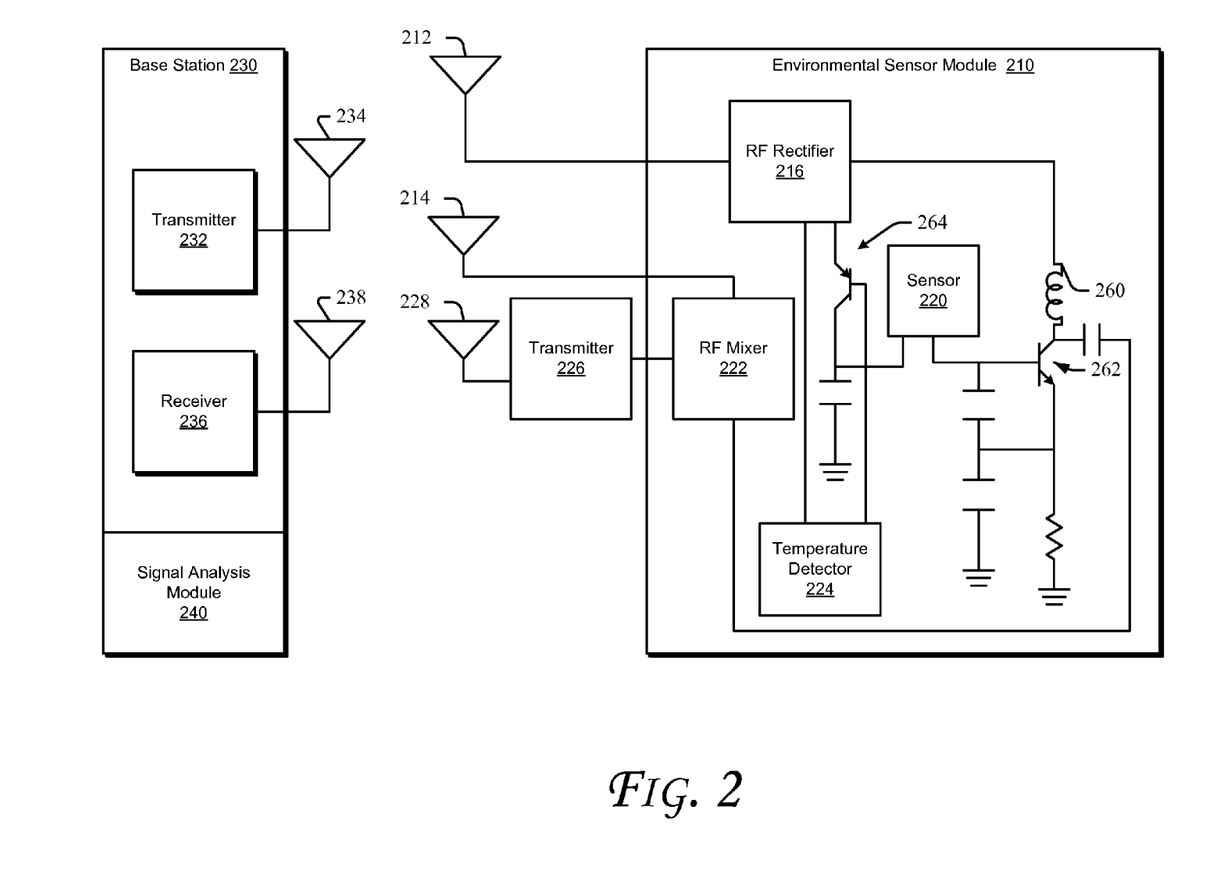
FIG. 2 is a schematic illustration of components of an environmental sensor system in accordance with some embodiments.

FIG. 2 is a schematic illustration of components of an environmental sensor system in accordance with some embodiments. In the embodiment depicted in FIG. 2, the environmental sensor module 210 is coupled to the base station 230 by a wireless communication link. Environmental sensor module 210 comprises an antenna 212 coupled to an RF rectifier 216. The RF rectifier 216 is coupled to an inductor 260 and to a sensor 220, which is, in turn, coupled to a transistor 262. In some embodiments the sensor 220 may comprise a conductive resonator. The rectifier 216, sensor 220, inductor 260, and transistor 262 define an oscillator circuit, the frequency of which is controlled at least in part by the resonance frequency of the sensor 220. The signal generated by the oscillator is input to an RF mixer 220, the output of which is coupled to a transmitter 226, and to an antenna 228. Antennas 212, 214, and 228 may represent the same or separate antennas, and may be implemented as conventional monopole antennas, dipole antennas, patch antennas, notch antennas, or the like.

The embodiment depicted in FIG. 2 comprises a temperature detector 224 such as, e.g., a thermocouple, a thermistor, or the like. Temperature detector 224 generates a signal representative of a temperature in proximity to environmental sensor module 210. In some embodiments the signal generated by the temperature data may be encoded by pulse width modulating the oscillator signal with the temperature signal. In one embodiment, the temperature detector 224 generates a voltage that is routed to a voltage-to-pulse converter within the temperature detector 224. The voltage-to-pulse converter outputs a pulse with a duration that is proportional to the detector voltage. The pulse from the converter is connected to the base of a PNP bipolar transistor 264 configured as a switch. The PNP transistor switches the oscillator on or off by switching the base bias of the oscillator transistor 262 on or off. This pulse is active low. The oscillator is on when the pulse is at a logic low level. The temperature detector and the voltage-to-pulse converter may be powered by the RF rectifier.

Base station 230 comprises a transmitter 232 coupled to an antenna 234 and a receiver 236 coupled to an antenna 238. Antennas 234 and 238 may represent the same or separate antennas, and may be implemented as conventional monopole antennas, dipole antennas, patch antennas, notch antennas, or the like. Base station 230 may include, or be coupled to, a signal analysis module 240. Aspects of the signal analysis module 240 will be described in greater detail below.

Figure 3A:
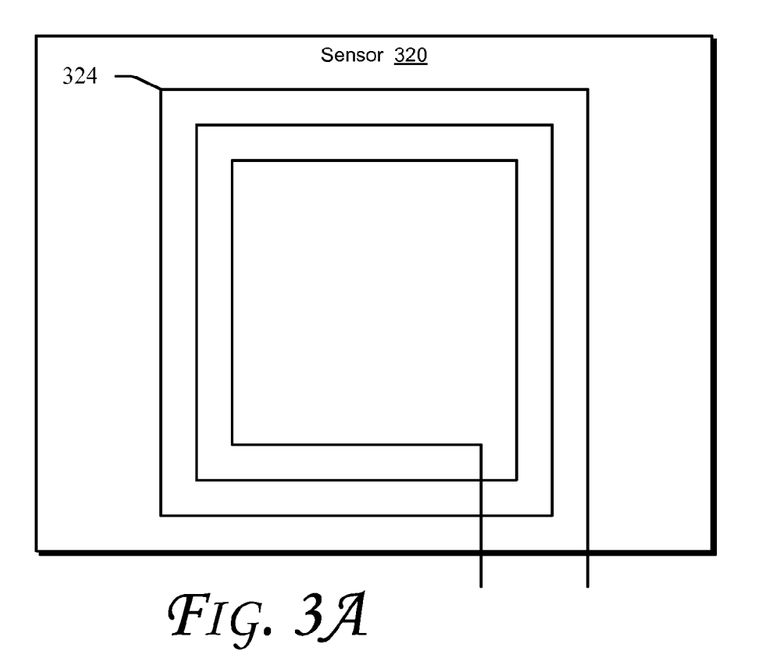
FIG. 3A is a top illustration and FIG. 3B is a side elevation illustration of an environmental sensor in accordance with some embodiments.
Figure 3B:
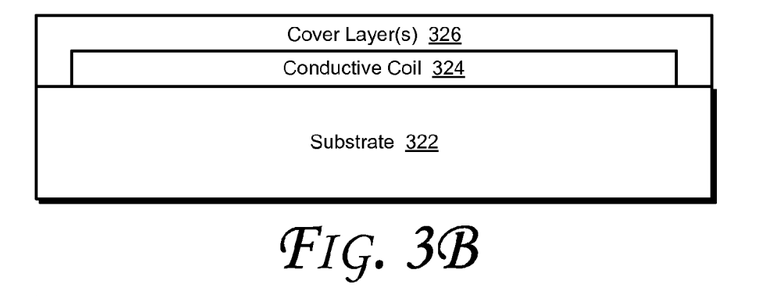

FIG. 3A is a top view and FIG. 3B is a side elevation view of an environmental sensor in accordance with some embodiments. In some embodiments, sensor 320 corresponds to the sensor 220 depicted in FIG. 2. Referring to FIGS. 3A and 3B, sensor 320 comprises a substrate 322, a conductive coil 324, and may comprise a cover layer 326. Substrate 322 may comprise a metamaterial substrate such as a model number 5880 glass microfiber substrate commercially available from Rogers Corporation of Rogers, Conn., USA. In one embodiment the sensor 320 measures approximately 10 mm×10 mm×1.25 mm in thickness. The conductive coil 324 may comprise copper spirals having a thickness of 0.034 millimeters and a 0.223 millimeter gap between the respective turns of the coil. The cover layer 326 may be formed from any suitable dielectric material that enhances the sensing function mentioned previously. In some embodiments, the cover layer 326 may be formed from a dielectric material, e.g., polyimide, capable of absorbing moisture in the ambient environment.

In alternate embodiments, the sensor 320 may comprise an array of conductive coils 324. The array may comprise a plurality of conductive coils having different resonant frequencies. The coils may be positioned adjacent one another on the same layer of the sensor 320, or may be stacked in successive layers of the sensor 320. In further embodiments, the sensor 320 may comprise one or more split ring resonators.

Figure 4:
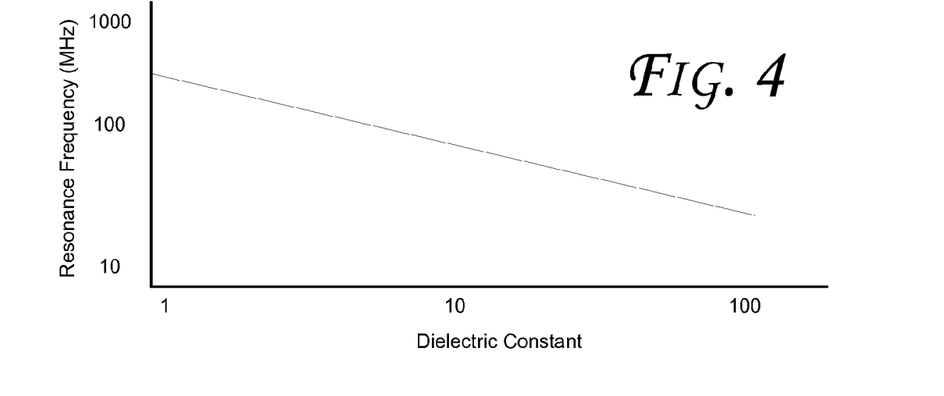
FIG. 4 is a graph illustrating a change in the resonance frequency in the environmental sensor in response to a change in the dielectric constant of the environment around the sensor, according to embodiments.

FIG. 4 is a graph illustrating a change in the resonance frequency of the conductive coils 324 in the environmental sensor 320 in response to a change in the dielectric constant of the medium surrounding the conductive coils 324, according to embodiments. Referring to FIG. 4, as the dielectric constant of the surrounding medium goes from 1 (e.g., air) to 80 (e.g., water) the resonant frequency of the spiral 324 decreases from approximately 400 MHz to approximately 100 MHz. Thus, given the resonance frequency of the conductive coils, a dielectric constant of the environment surrounding the conductive coils 324 can be determined using the relationship illustrated in FIG. 4. The graph depicted in FIG. 4 may be modified to accommodate changes in the relationship between resonance frequency and dielectric constant introduced by the addition of a cover layer 326. In any event, an increase in the relative humidity of the environment surrounding the conductive coils 324 will result in a decrease in the resonance frequency of the conductive coils 324. This is due to a change in the dielectric constant surrounding the sensor, which is a linear combination of the air and water dielectric constant, depending on the humidity.

Figure 5:
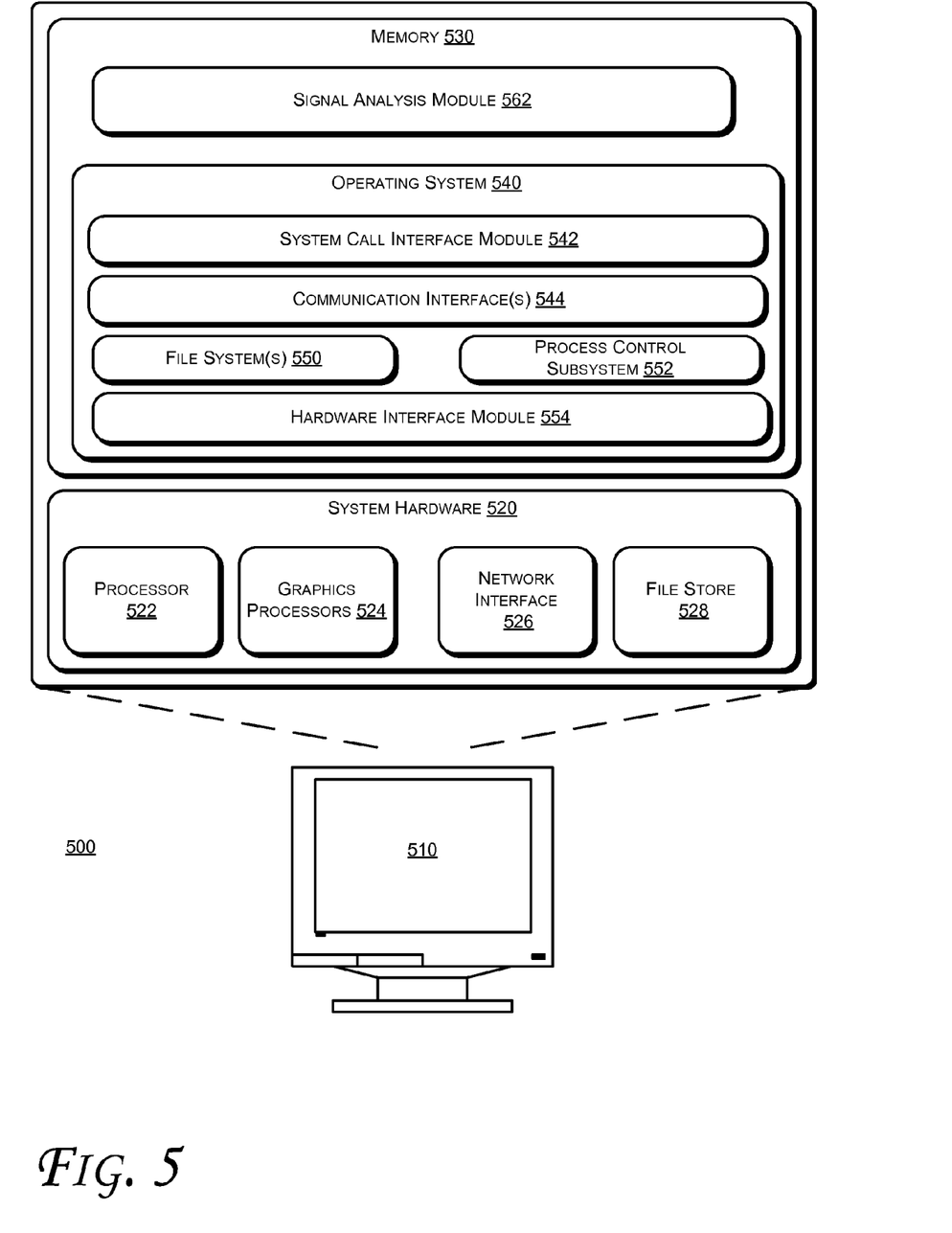
FIG. 5 is a schematic illustration of a processing device which may be used in an environmental sensor system, according to embodiments.

FIG. 5 is a schematic illustration of a processing device which may be used in an environmental sensor system, according to embodiments. In some embodiments, the signal analysis module may be implemented as logic instructions which execute on a general purpose processor, e.g., a computing device. In one embodiment, system 500 includes system hardware 520 and memory 530, which may be implemented as random access memory and/or read-only memory.

System hardware 520 may include one or more processors 522, a graphics processor 524, network interfaces 526, and a file store 528. As used herein, the term "processor" should be construed to include any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor 524 may function as adjunct processor that manages graphics and/or video operations. Graphics processors 524 may be integrated onto a motherboard of the processing device 500 or may be coupled via an expansion slot on the motherboard.

In one embodiment, network interface 526 could be a wired interface such as an Ethernet interface or a wireless interface such as an IEEE 802.11a, b or g-compliant interface. Another example of a wireless interface would be a general packet radio service (GPRS) interface.

A file store 528 which may be implemented as, e.g., one or more hard drives, CD-ROM drives, DVD-ROM drives, or other types of storage devices. File store 528 may also be external to system 500 such as, e.g., one or more external hard drives, network attached storage, or a separate storage network.

System 500 may include, or be coupled to, a display device 510. In some embodiments, display device 510 may comprise a liquid crystal display (LCD) device, a cathode ray tube (CRT) device, or the like. Display 510 may comprise, or be coupled to, one or more auditory interfaces, e.g., a speaker.

Memory 530 may include an operating system 540 for managing operations of system 500. In one embodiment, operating system 540 includes a hardware interface module 554 that provides an interface to system hardware 520. In addition, operating system 540 may include a file system 550 that manages files used in the operation of system 500 and a process control subsystem 552 that manages processes executing on system 500.

Operating system 540 may include (or manage) one or more communication interfaces that may operate in conjunction with system hardware 520 to receive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

In one embodiment, memory 530 includes a signal analysis module 562 to determine an environmental condition from at least one signal characteristic of a signal transmitted from the environmental sensor module 210 to the base station 230. The signal analysis module 562 may correspond to the signal analysis modules 140 and 240 depicted in FIG. 1 and FIG. 2, respectively. In one embodiment, a signal analysis module 562 may include logic instructions encoded in a computer-readable storage medium which, when executed by processor 522, cause the processor 522 to analyze one or more signal characteristics to determine an environmental condition from the signal.

Having now described structural components of a system to detect environmental conditions, additional details about the operations implemented by components of the system are described below.

Figure 6:
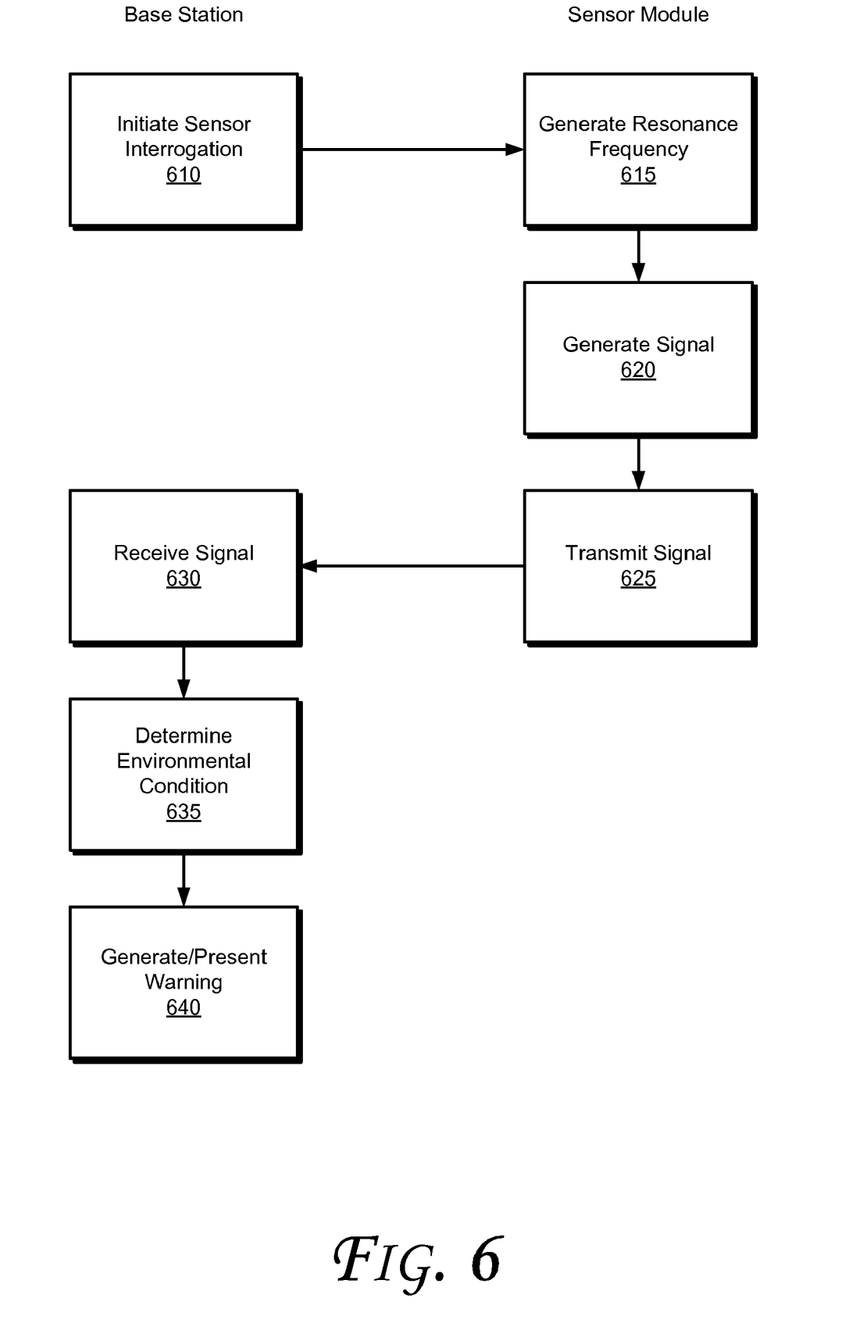
FIG. 6 is a flowchart illustrating operations in a method to detect one or more environmental conditions, according to embodiments.

FIG. 6 is a flowchart illustrating operations in a method to detect one or more environmental conditions, according to embodiments. Prior to initiating the process depicted in FIG. 6, one or more sensors are positioned proximate the surface of interest. Referring briefly back to FIGS. 2 and 3A-3B, in one embodiment the sensor module(s) 210 function effectively as passive sensors in the sense that the sensors 210 reflect an interrogation signal transmitted from the base station(s) 230. The frequency of the reflected signal may vary as a function of environmental conditions proximate the sensor.

In other embodiments the sensor module(s) 210 function as an active sensor in the sense that the sensor(s) 210 generate an electromagnetic signal. Thus, at operation 610 a base station(s) 230 initiates a sensor interrogation process. In one embodiment the base station(s) 230 transmit a carrier signal in the 2.44 GHz frequency range. The environmental sensor module(s) 210 receive the interrogation signal via the antenna 212 and the receiver 214. In some embodiments, the received signal is rectified by RF rectifier 216, which supplies power to the environmental sensor module 210.

At operation 615, the environmental sensor 220 generates a resonance frequency in response to the interrogation signal. As described above, the sensor 220 may be configured to generate a resonance frequency which varies as a function of an environmental condition, e.g., humidity, temperature or the like, or in response to the presence of a biological or chemical agent. In some embodiments, the response of the sensor for biological or chemical detection may be based on the adsorption of the agent of interest on a layer covering the resonant structure. For example, a change in the dielectric constant of the layer after adsorption may result in a shift of the frequency of the resonant structure, thereby allowing detection of a particular chemical or biological agent. The layer may be selected based on its adsorption properties for the chemical or biological species of interest.

At operation 620 the environmental sensor module 210 generates a signal which may be referred to as an environmental condition signal. In embodiments in which the environmental sensor module functions as a passive reflector, the environmental condition signal may correspond to the resonance frequency generated in operation 615. In embodiments in which the environmental sensor module actively generates an electromagnetic signal, the local oscillator circuit generates a signal which, in one embodiment, is in a frequency range between 110 MHz and 130 MHz. The output frequency of the oscillator circuit is controlled by the resonance frequency of the sensor 220. In addition, the output signal from the temperature detector 224 may also modulate the signal from the local oscillator, e.g., by pulse width modulation.

In one embodiment the transmitter 226 operates at a carrier frequency of 2.4 GHz and transmits (operation 625) two signals generated by the RF mixer 222: a first signal at the frequency of the RF carrier plus the local oscillator frequency and a second signal at the frequency of the RF carrier minus the local oscillator frequency. Thus, in one embodiment the environmental sensor module 210 transmits redundant signals which have characteristics that indicate environmental conditions, e.g., temperature and humidity, in proximity to the sensor.

At operation 630 the signal is received at the base station, e.g., in receiver 236, and at operation 635 at least one environmental condition is determined from a characteristic of the received signal. In one embodiment, signal analysis module 240 isolates the environmental condition signal component generated by sensor 220 and oscillator 218 from the received signal.

In one embodiment the signal analysis module 240 maintains a table of values, alone or in combination with mathematical relationships, that correlate signals characteristics with environmental conditions. By way of example, referring to FIG. 5, the signal analysis module 562 may maintain a table of values that correlates the environmental condition signal isolated from the received signal with one or more environmental conditions in proximity to the environmental sensor 210. The environmental condition signal component may be compared to values in the table to determine an environmental condition in proximity to the environmental sensor 210.

At operation 640 the signal analysis module 562 generates a warning signal and presents a warning signal when a component of the environmental condition signal indicates problematic conditions. For example, in one embodiment the signal analysis module 562 generates a warning when at least one of the signal components indicates that conditions are conducive to the formation of ice in proximity to the environmental sensor module. The warning may be presented via a visual interface, e.g., on display 510, or via an audible interface, e.g., by a speaker or the like.

Figure 7:
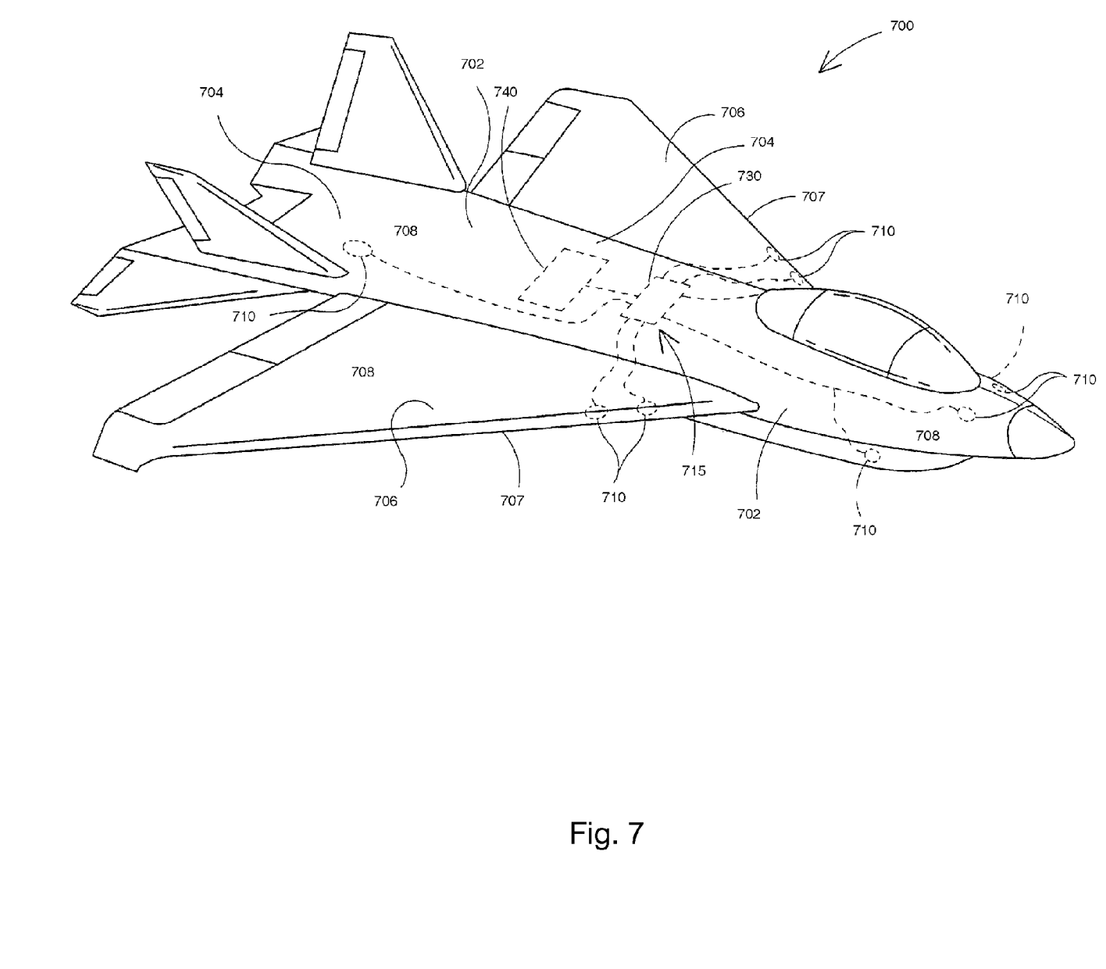
FIG. 7 is a schematic illustration of an aircraft utilizing an environmental sensor system, according to embodiments.

FIG. 7 is a schematic illustration of an aircraft comprising an environmental sensor system, according to embodiments. In one embodiment, the aircraft 700 includes an airframe 702 comprising a fuselage section 704 and a pair of wings 706 extending outwardly from the fuselage 704. Both the fuselage 704 and the wings 706 are covered in a skin forming an outer surface 708 of the aircraft 700. Each wing 706 includes a leading edge 707.

The aircraft 700 further comprises an environmental monitoring system designated generally by reference numeral 715, which in turn comprises a base station 730, and a signal analysis module 740. The environmental monitoring system 715 further comprises a plurality of environmental sensor modules 710 mounted on the airframe 702 and communicatively coupled to the base station 730. More specifically, in the exemplary embodiments, each sensor module 710 is mounted on an airframe structure such that each environmental sensor module 710 provides measurement of a predetermined environmental parameter or parameters in proximity to the sensor 710. Although the environmental sensor modules 710 are illustrated and described herein in the exemplary manner, it should be understood that the airframe 702 may include any number of sensor modules operatively configured to measure any desired parameter, and it should also be understood that such sensor modules may be mounted on the airframe 702 anywhere and in any suitable manner, with respect to the airframe 702 and the outer surface 708, facilitating measurement of the selected parameter within a predetermined accuracy. For example, in one embodiment, one or more of the environmental sensor modules 710 may be mounted on the airframe such that the sensor(s) protrudes in the free-stream.

Thus, there is described herein an environmental sensor system to detect environmental conditions proximate one or more sensors. In some embodiments the environmental sensor system may utilize one or more sensors formed from a metamaterial. The one or more sensors may utilize an electrically resonant structure having a resonant frequency that varies as a function of one or more environmental conditions, e.g., temperature, humidity, or the presence of a chemical or biological agent. In some embodiments the sensors may function as a passive reflector of electromagnetic signals, while in other embodiments the sensors may function as one component of an oscillator circuit which generates a signal at a frequency that varies as a function of one or more environmental conditions e.g., temperature, humidity, or the presence of a chemical or biological agent. The signal(s) generated by the sensor(s) are received by a base station. A signal analysis module coupled to the base station processes the signal and presents a suitable warning on a user interface when the signals satisfy a condition, e.g., when the signal indicates that conditions are favorable for the formation of ice.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to detect one or more environmental conditions in proximity to a surface, comprising:
   activating an environmental sensor module proximate the surface, wherein the environmental sensor is coupled to a transmitter and comprises a metamaterial-based electrically resonant structure which comprises a complement of a metamaterial spiral or split ring resonator and having a resonance frequency which varies in response to changes in at least one of:
   a humidity proximate the sensor module;
   a temperature proximate the sensor module; or
   the presence of a chemical or biological agent proximate the sensor module;
   generating, in the environmental sensor module, an electromagnetic signal which comprises information about the resonance frequency;
   receiving, in a remote receiver, the electromagnetic signal comprising the signal generated by the environmental sensor module;
   determining an environmental condition from the electromagnetic signal;
   generating a first electromagnetic signal at a carrier frequency plus the local oscillator frequency; and
   transmitting the first electromagnetic signal.

2. The method of claim 1, wherein:
the environmental sensor module comprises a passive metamaterial resonator; and
activating the environmental sensor module comprises interrogating the passive resonator by transmitting an electromagnetic signal which is reflected by the environmental sensor module.

3. The method of claim 1, wherein the electrically resonant structure comprises at least one conductive metamaterial spiral resonator.

4. The method of claim 1, wherein the electrically resonant structure comprises at least one metamaterial split-ring resonator.

5. The method of claim 1, wherein:
the environmental sensor module comprises a local oscillator circuit; and
the electrically resonant structure modulates a local oscillator frequency generated by the local oscillator circuit.

6. The method of claim 1, further comprising:
generating a second electromagnetic signal at a carrier frequency minus the local oscillator frequency; and
transmitting the second electromagnetic signal.

7. The method of claim 1, wherein receiving an electromagnetic signal comprises:
receiving at least a first electromagnetic signal generated by a base station and a reflected by the environmental sensor module at a different resonant frequency; and
isolating the resonance frequency from the first electromagnetic signal.

8. The method of claim 7, further comprising:
receiving at least a second electromagnetic signal generated by the environmental sensor module due to a different environmental parameter; and
isolating the resonance frequency the second electromagnetic signal.

9. The method of claim 1, further comprising:
generating a warning signal when the resonance frequency satisfies a condition; and
presenting the warning signal via a user interface.

10. The method of claim 1, further comprising:
generating a warning signal when at least one of the relative humidity or the temperature in proximity to the sensor module indicate the possibility of ice forming in proximity to the sensor module; and
presenting the warning signal via a user interface.

11. The method of claim 1, wherein the first environmental sensor module and the remote receiver are mounted on a movable vehicle.

12. A system to detect one or more environmental conditions in proximity to a surface, comprising:
an environmental sensor module proximate the surface, wherein the environmental sensor comprises:
a local oscillator circuit,
a mixer to generate a first electromagnetic signal at a carrier frequency plus the local frequency generated by the local oscillator circuit
a metamaterial-based electrically resonant structure which modulates the local frequency generated by the local oscillator circuit and having a resonance frequency which varies in response to changes in at least one of:
a humidity proximate the sensor module;
a temperature proximate the sensor module; or
the presence of a chemical or biological agent proximate the sensor module; and
a transmitter to transmit the first electromagnetic signal;
a remote receiver to receive an electromagnetic signal comprising the signal generated by the electrically resonant structure; and
a signal analysis module to determine an environmental condition from the at least one environmental condition signal.

13. The system of claim 12, wherein the electrically resonant structure comprises at least one conductive metamaterial spiral resonator.

14. The system of claim 12, wherein electrically resonant structure comprises at least one metamaterial split-ring resonator or resonators.

15. The system of claim 12, wherein the electrically resonant structure comprises a complement of a metamaterial spiral or split ring resonator or resonators.

16. The system of claim 12, wherein:
the environmental sensor module comprises a passive metamaterial resonator.

17. The system of claim 12, wherein:
the mixer generates a second electromagnetic signal at a carrier frequency generated by the local oscillator circuit minus the local frequency; and
the transmitter transmits the second electromagnetic signal.

18. The system of claim 12, wherein the signal analysis module:
generates a warning signal when the at least one environmental condition satisfies a criteria; and
presents the warning signal via a user interface.

19. The system of claim 12, wherein the signal analysis module:
generates a warning signal when at least one of the relative humidity or the temperature in proximity to the sensor module indicate the possibility of ice forming in proximity to the sensor module; and
presents the warning signal via a user interface.

20. The system of claim 12 wherein the system is mounted on a movable vehicle.

21. An aircraft, comprising:
a fuselage; and
a system to detect one or more environmental conditions in proximity to a surface of the fuselage, comprising:
an environmental sensor module proximate the surface, wherein the environmental sensor comprises:
a local oscillator circuit,
a mixer to generate a first electromagnetic signal at a carrier frequency plus the local frequency generated by the local oscillator circuit
a metamaterial-based electrically resonant structure which modulates the local frequency generated by the local oscillator circuit and having a resonance frequency which varies in response to changes in at least one of:
a humidity proximate the sensor module;
a temperature proximate the sensor module; or
the presence of a chemical or biological agent proximate the sensor module; and
a transmitter to transmit the first electromagnetic signal;
a remote receiver to receive an electromagnetic signal comprising the signal generated by the electrically resonant structure; and
a signal analysis module to determine an environmental condition from the at least one environmental condition signal.

* * * * *